(12) United States Patent
Dutta et al.

(10) Patent No.: US 10,030,537 B2
(45) Date of Patent: Jul. 24, 2018

(54) TURBINE NOZZLE WITH INNER BAND AND OUTER BAND COOLING

(71) Applicant: General Electric Company, Schenectady, NY (US)

(72) Inventors: Sandip Dutta, Greenville, SC (US); Benjamin Paul Lacy, Greer, SC (US); Joseph Anthony Weber, Simpsonville, SC (US); Peter Galen Stevens, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 248 days.

(21) Appl. No.: 14/880,565

(22) Filed: Oct. 12, 2015

(65) Prior Publication Data

US 2017/0101890 A1    Apr. 13, 2017

(51) Int. Cl.
| | |
|---|---|
| *F01D 25/12* | (2006.01) |
| *F02C 7/12* | (2006.01) |
| *F02C 3/04* | (2006.01) |
| *F01D 9/04* | (2006.01) |

(52) U.S. Cl.
CPC ............. *F01D 25/12* (2013.01); *F01D 9/041* (2013.01); *F02C 3/04* (2013.01); *F02C 7/12* (2013.01); *F05D 2220/32* (2013.01); *F05D 2240/128* (2013.01); *F05D 2240/35* (2013.01); *F05D 2260/221* (2013.01)

(58) Field of Classification Search
CPC . F01D 25/12; F01D 9/041; F01D 5/18; F01D 9/04; F02C 3/04; F02C 7/12; F05D 2220/32; F05D 2240/128; F05D 2240/35; F05D 2260/221
See application file for complete search history.

(56) References Cited

U.S. PATENT DOCUMENTS

| | | |
|---|---|---|
| 3,844,679 A | 10/1974 | Grondahl et al. |
| 4,353,679 A | 10/1982 | Hauser |
| | (Continued) | |

FOREIGN PATENT DOCUMENTS

| | | |
|---|---|---|
| EP | 1 074 695 A2 | 2/2001 |
| EP | 1 881 156 A2 | 1/2008 |
| | (Continued) | |

OTHER PUBLICATIONS

Co-pending U.S. Appl. No. 14/880,575, filed Oct. 12, 2015.
(Continued)

*Primary Examiner* — Logan Kraft
*Assistant Examiner* — Peter T Hrubiec
(74) *Attorney, Agent, or Firm* — Dority & Manning, P.A.

(57) ABSTRACT

A turbine nozzle includes an airfoil that extends in span from an inner band to an outer band where the inner band and the outer band define outer flow boundaries of the turbine nozzle. The inner band includes a gas side surface that is at least partially covered by one or more inner plates. The inner band also includes a plurality of cooling channels formed within the gas side surface beneath the one or more inner plates. The outer band includes a gas side surface that is at least partially covered by one or more outer plates. The outer band comprises a plurality of cooling channels formed within the gas side surface beneath the one or more outer plates.

19 Claims, 9 Drawing Sheets

(56) References Cited

U.S. PATENT DOCUMENTS

| | | | |
|---|---|---|---|
| 5,344,283 A | * | 9/1994 | Magowan ............... F01D 5/187 |
| | | | 415/115 |
| 6,241,467 B1 | | 6/2001 | Zelesky et al. |
| 8,096,772 B2 | | 1/2012 | Liang |
| 8,511,995 B1 | | 8/2013 | Liang |
| 8,632,298 B1 | | 1/2014 | Liang |
| 8,770,936 B1 | | 7/2014 | Liang |
| 9,015,944 B2 | | 4/2015 | Lacy et al. |
| 2010/0226788 A1 | | 9/2010 | Liang |
| 2012/0082549 A1 | | 4/2012 | Ellis et al. |
| 2012/0328451 A1 | | 12/2012 | Lomas et al. |

FOREIGN PATENT DOCUMENTS

| | | |
|---|---|---|
| EP | 2 407 639 A1 | 1/2012 |
| NO | 2014/052538 A1 | 4/2014 |
| WO | 94/17285 A1 | 8/1994 |

OTHER PUBLICATIONS

Co-pending U.S. Appl. No. 14/880,580, filed Oct. 12, 2015.
Extended European Search Report and Opinion issued in connection with corresponding EP Application No. 16193063.1 dated Mar. 13, 2017.

* cited by examiner

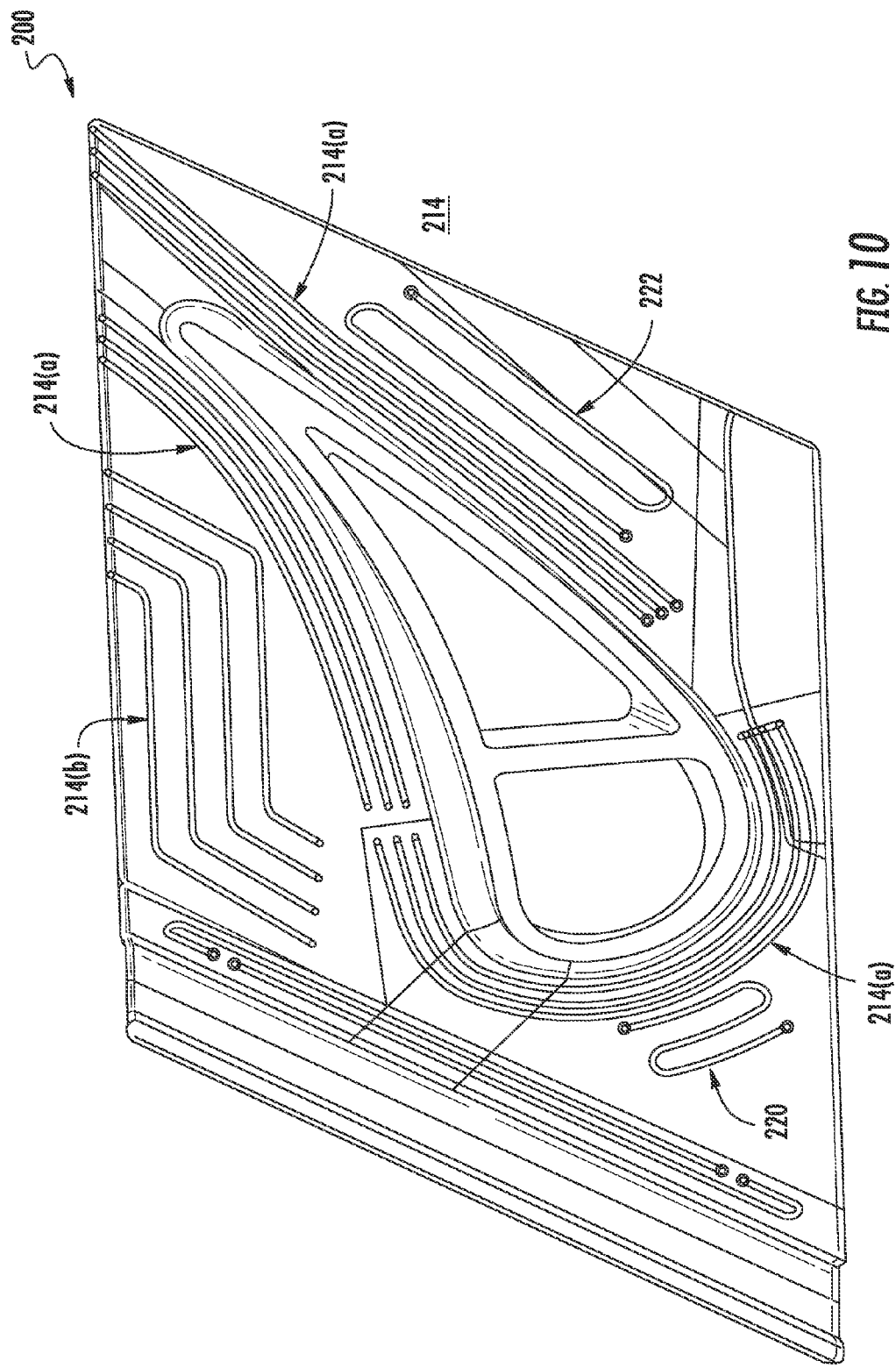

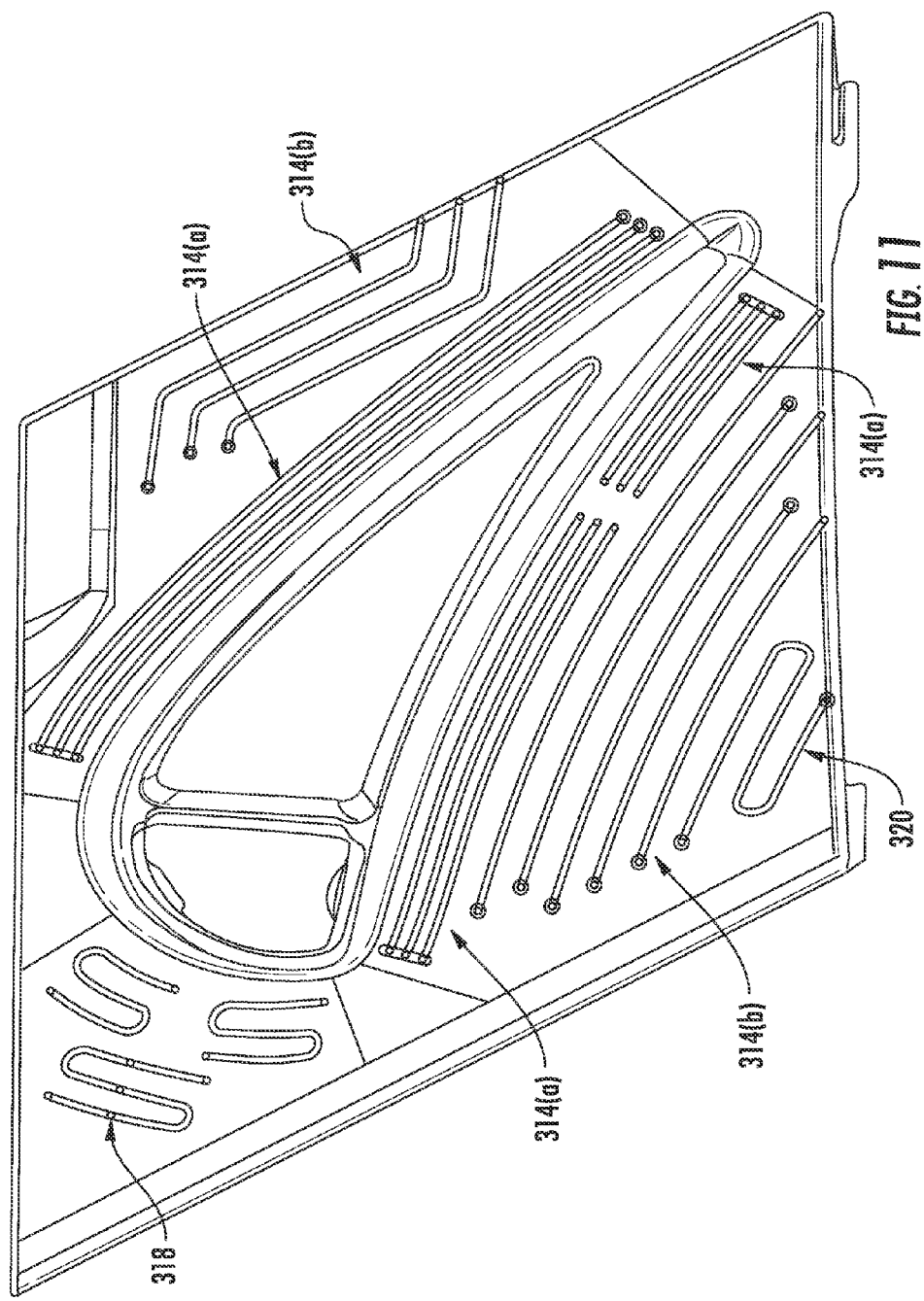

TURBINE NOZZLE WITH INNER BAND AND OUTER BAND COOLING

FIELD OF THE INVENTION

The present invention generally relates to a turbine nozzle for a gas turbine. More particularly, this invention relates to a turbine nozzle having inner band and outer band cooling.

BACKGROUND OF THE INVENTION

A gas turbine, such as an industrial, aircraft or marine gas turbine generally includes, in serial flow order, a compressor, a combustor and a turbine. The turbine has multiple stages with each stage including a row of turbine nozzles and an adjacent row of turbine rotor blades disposed downstream from the turbine nozzles. The turbine nozzles are held stationary within the turbine and the turbine rotor blades rotate with a rotor shaft. The various turbine stages define a hot gas path through the turbine.

During operation, the compressor provides compressed air to the combustor. The compressed air is mixed with fuel and burned in a combustion chamber or reaction zone defined within the combustor to produce a high velocity stream of hot gas. The hot gas flows from the combustor into the hot gas path of the turbine via a turbine inlet. As the hot gas flows through each successive stage kinetic energy from the high velocity hot gas is transferred to the rows of turbine rotor blades, thus causing the rotor shaft to rotate and produce mechanical work.

Turbine efficiency may be related, at least in part, to the temperature of the hot gas flowing through the turbine hot gas path. For example, the higher the temperature of the hot gas, the greater the overall efficiency of the turbine. The maximum temperature of the hot gas is limited, at least in part, by material properties of the turbine components such as the turbine nozzles and turbine rotor blades and by the effectiveness of various cooling circuits and a cooling medium that circulates through the cooling circuits to provide cooling to the various turbine components.

A first stage of turbine nozzles and turbine rotor blades is positioned closest to the turbine inlet and is thus exposed to the highest hot gas temperatures. The first stage turbine nozzle includes an airfoil that extends in span between an inner band or shroud and an outer band or shroud. The inner band and the outer band define inner and outer flow boundaries of the hot gas path and are exposed to the hot gases.

The first stage turbine nozzle is typically cooled by passing a cooling medium such as compressed air through a central or core cooling channel that extends radially through the airfoil portion of the turbine nozzle. A portion of the cooling medium flows through various film holes defined along the airfoil, thus providing film cooling to the airfoil. The inner band and the outer band of the turbine nozzle are cooled via backside or impingement cooling. However, benefits of backside cooling may be limited. Therefore, a turbine nozzle with improved cooling would be useful.

BRIEF DESCRIPTION OF THE INVENTION

Aspects and advantages of the invention are set forth below in the following description, or may be obvious from the description, or may be learned through practice of the invention.

One embodiment of the present invention is a turbine nozzle. The turbine nozzle includes an airfoil that extends in span from an inner band to an outer band. The inner band and the outer band together define inner and outer flow boundaries of the turbine nozzle. The inner band has a gas side surface that is at least partially covered by one or more inner plates. The inner band also includes a plurality of cooling channels formed within the gas side surface beneath the one or more inner plates. The outer band has a gas side surface that is at least partially covered by one or more outer plates. The outer band also includes a plurality of cooling channels formed within the gas side surface beneath the one or more outer plates.

Another embodiment of the present invention is a gas turbine. The gas turbine includes a compressor, a combustor downstream from the compressor and a turbine disposed downstream from the combustor. The turbine comprises a stage having in serial flow order a row of turbine nozzles and a row of turbine rotor blades. At least one turbine nozzle comprises an airfoil that extends in span from an inner band to an outer band where the inner band and the outer band define inner and outer flow boundaries of the turbine nozzle. The inner band includes a gas side surface that is at least partially covered by one or more inner plates. The inner band also comprises a plurality of cooling channels formed within the gas side surface beneath the one or more inner plates. The outer band has a gas side surface that is at least partially covered by one or more outer plates. The outer band also comprises a plurality of cooling channels formed within the gas side surface beneath the one or more outer plates.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which:

FIG. 10 is a cross sectioned top view of a portion of the turbine nozzle as shown in FIG. 4, according to at least one embodiment of the present invention; and FIG. 11 is a cross sectioned bottom view of a portion of the turbine nozzle as shown in FIG. 5, according to at least one embodiment of the present invention.

DETAILED DESCRIPTION OF THE INVENTION

Figure 1:
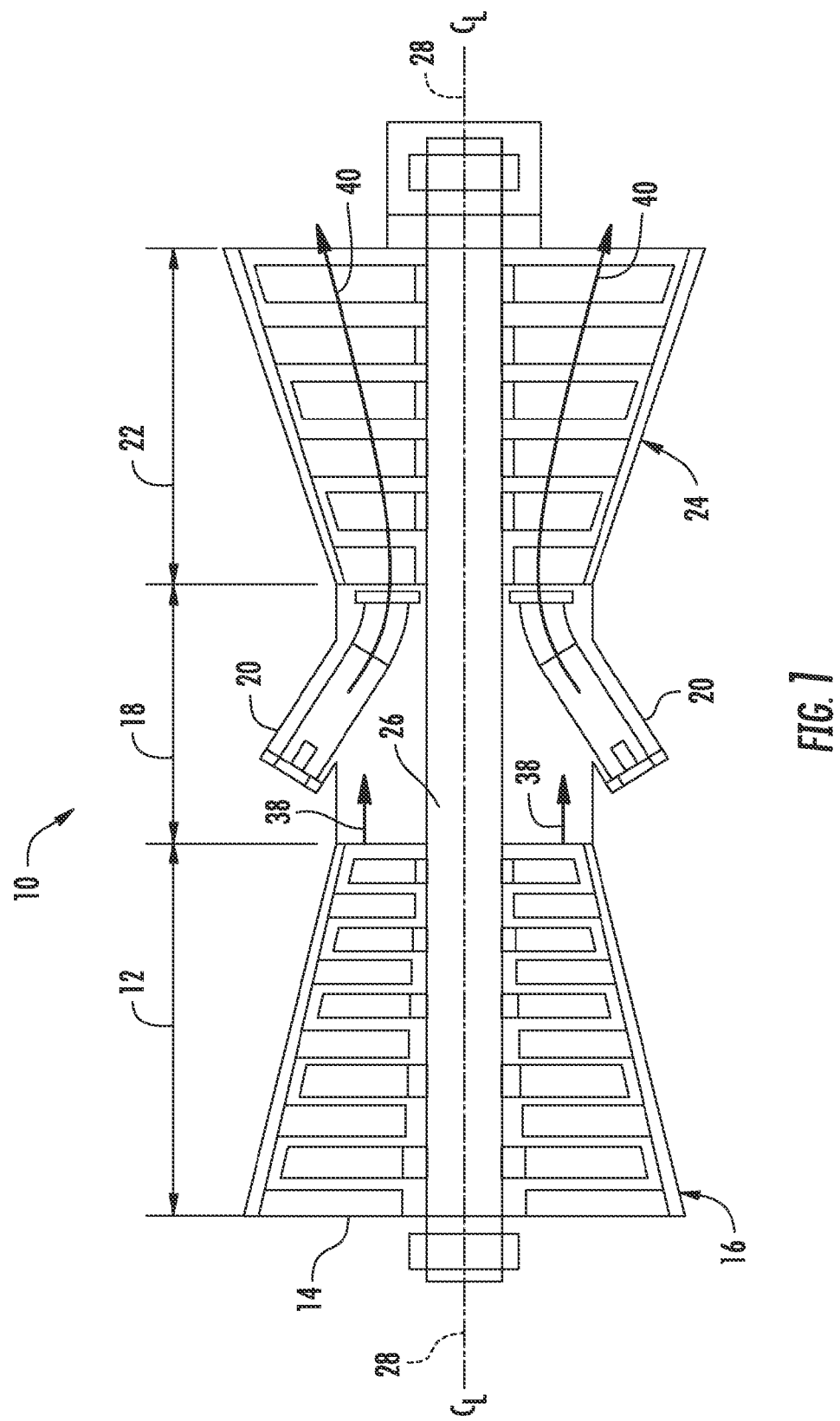
FIG. 1 is a schematic view of an exemplary gas turbine as may incorporate various embodiments of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, and the term "axially" refers to the relative direction that is substantially parallel and/or coaxially aligned to an axial centerline of a particular component.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Although exemplary embodiments of the present invention will be described generally in the context of a turbine nozzle for a land based power generating gas turbine for purposes of illustration, one of ordinary skill in the art will readily appreciate that embodiments of the present invention may be applied to any style or type of gas turbine and are not limited to land based power generating gas turbines unless specifically recited in the claims.

Referring now to the drawings, FIG. 1 illustrates a schematic of an exemplary gas turbine 10 as may incorporate various embodiments of the present invention. As shown, the gas turbine 10 generally includes a compressor section 12 having an inlet 14 disposed at an upstream end of an axial compressor 16. The gas turbine 10 further includes a combustion section 18 having one or more combustors 20 positioned downstream from the compressor 16 and a turbine section 22 including a turbine 24 such as an expansion turbine is disposed downstream from the combustion section 18. A shaft 26 extends axially through the compressor 16 and the turbine 24 along an axial centerline 28 of the gas turbine 10.

Figure 2:
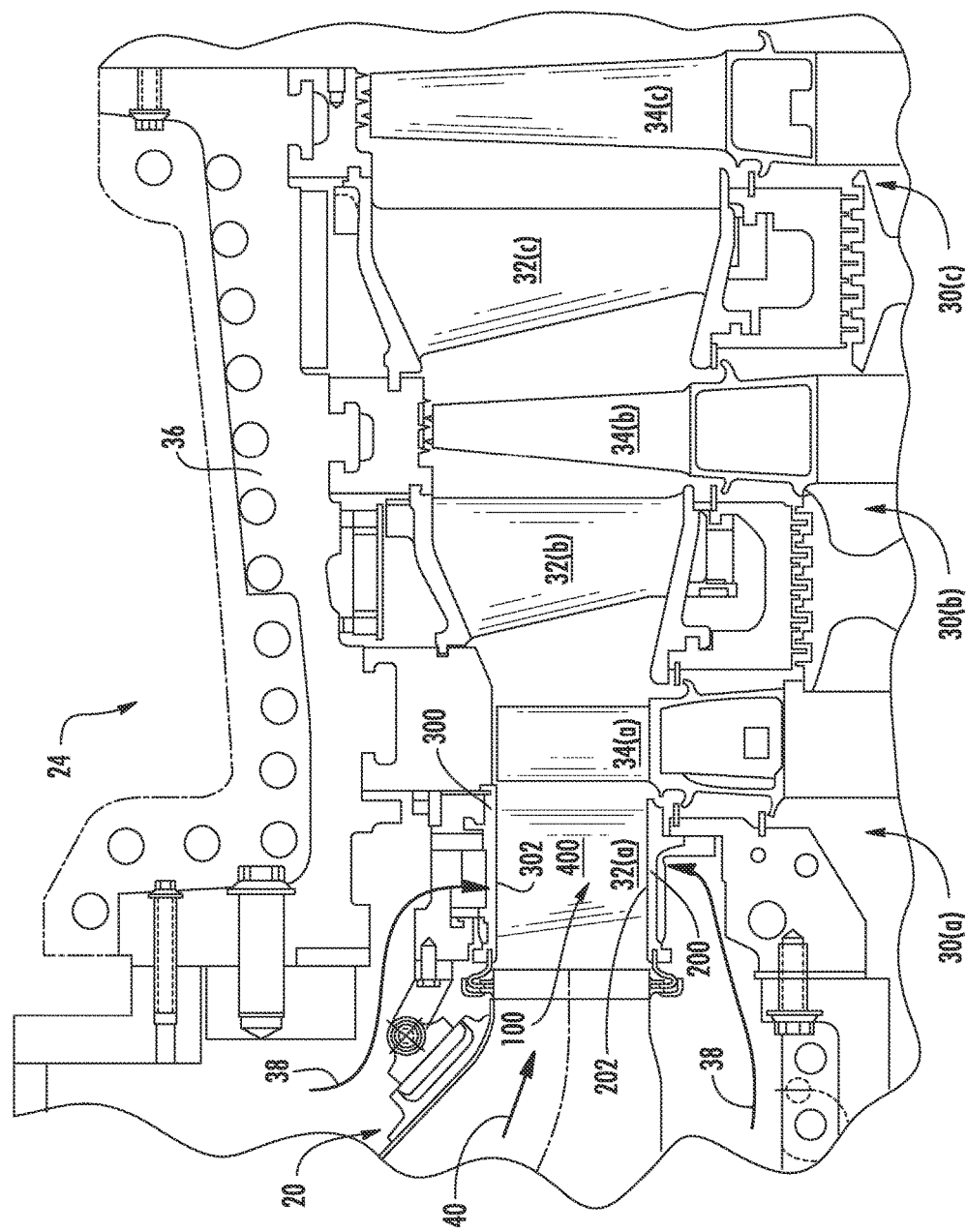
FIG. 2 is a cross sectioned side view of an exemplary turbine section of a gas turbine as may incorporated in various embodiments of the present invention.

FIG. 2 provides a cross sectioned side view of an exemplary turbine 24 as may incorporate various embodiments of the present invention. As shown in FIG. 2, the turbine 24 may include multiple turbine stages 30. For example, the turbine 24 may include three turbine stages 30 including a first stage 30(a), second stage 30(b) and third stage 30(c). The total number of turbine stages 30 may be more or less than three and embodiments of the present invention should not be limited to three turbine stages unless otherwise recited in the claims.

As shown in FIG. 2, each stage 30(a-c) includes, in serial flow order, a corresponding row of turbine nozzles 32(a), 32(b) and 32(c) and a corresponding row of turbine rotor blades 34(a), 34(b) and 34(c) axially spaced along the shaft 26 (FIG. 1). A casing or shell 36 circumferentially surrounds each stage 30(a-c) of the turbine nozzles 32(a-c) and the turbine rotor blades 34(a-c). The turbine nozzles 32(a-c) remain stationary relative to the turbine rotor blades 34(a-c) during operation of the gas turbine 10.

In operation, as shown in FIGS. 1 and 2 collectively, compressed air 38 from the compressor 16 is provided to the combustors 20 where it is mixed with fuel and burned to provide a stream of hot combustion gases 40 that flows from the combustors 20 into the turbine 24. At least a portion of the compressed air 38 may be used as a cooling medium for cooling the various components of the turbine such as the turbine nozzles 32(a-c) and the turbine rotor blades 32(a-c).

Figure 3:
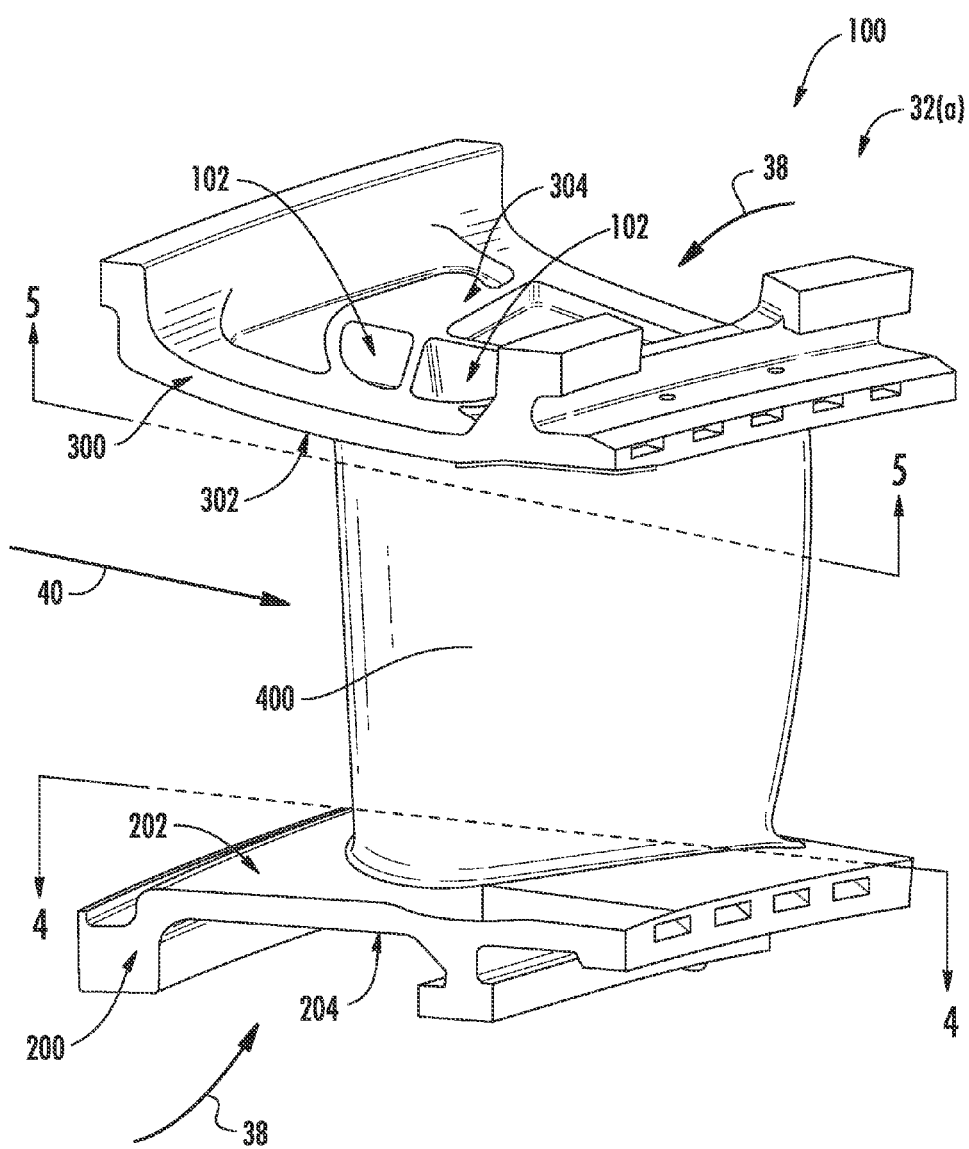
FIG. 3 is a perspective side view of an exemplary turbine nozzle as may incorporate one or more embodiments of the present invention.

FIG. 3 provides a perspective view of an exemplary turbine nozzle 100 as may be incorporated into the turbine 24 as shown in FIG. 2 and as may incorporate various embodiments of the present invention. Turbine nozzle 100 may correspond with or be installed in place of any of turbine nozzles 32(a-c). In particular embodiments, turbine nozzle 100 corresponds with turbine nozzle 32(a) of the first stage 30(a) which may also be known in the industry as a stage one nozzle or S1N.

As shown in FIG. 3, the turbine nozzle 100 includes an inner band 200, an outer band 300 that is radially spaced from the inner band 200 and an airfoil 400 that extends in span from the inner band 200 to the outer band 300. The inner band 200 includes a gas side 202 and a back side 204 that is oriented radially inwardly from the gas side 202. The outer band 300 includes a gas side 302 and a back side 304 that is oriented radially outwardly from the gas side 302. As shown in FIGS. 2 and 3 collectively, the gas side 302 of the outer band 300 and the gas side 202 of the inner band 200 define inner and outer radial flow boundaries for the stream of hot combustion gases 40 flowing at high velocity from the combustors 20 through the turbine 24.

Figure 4:
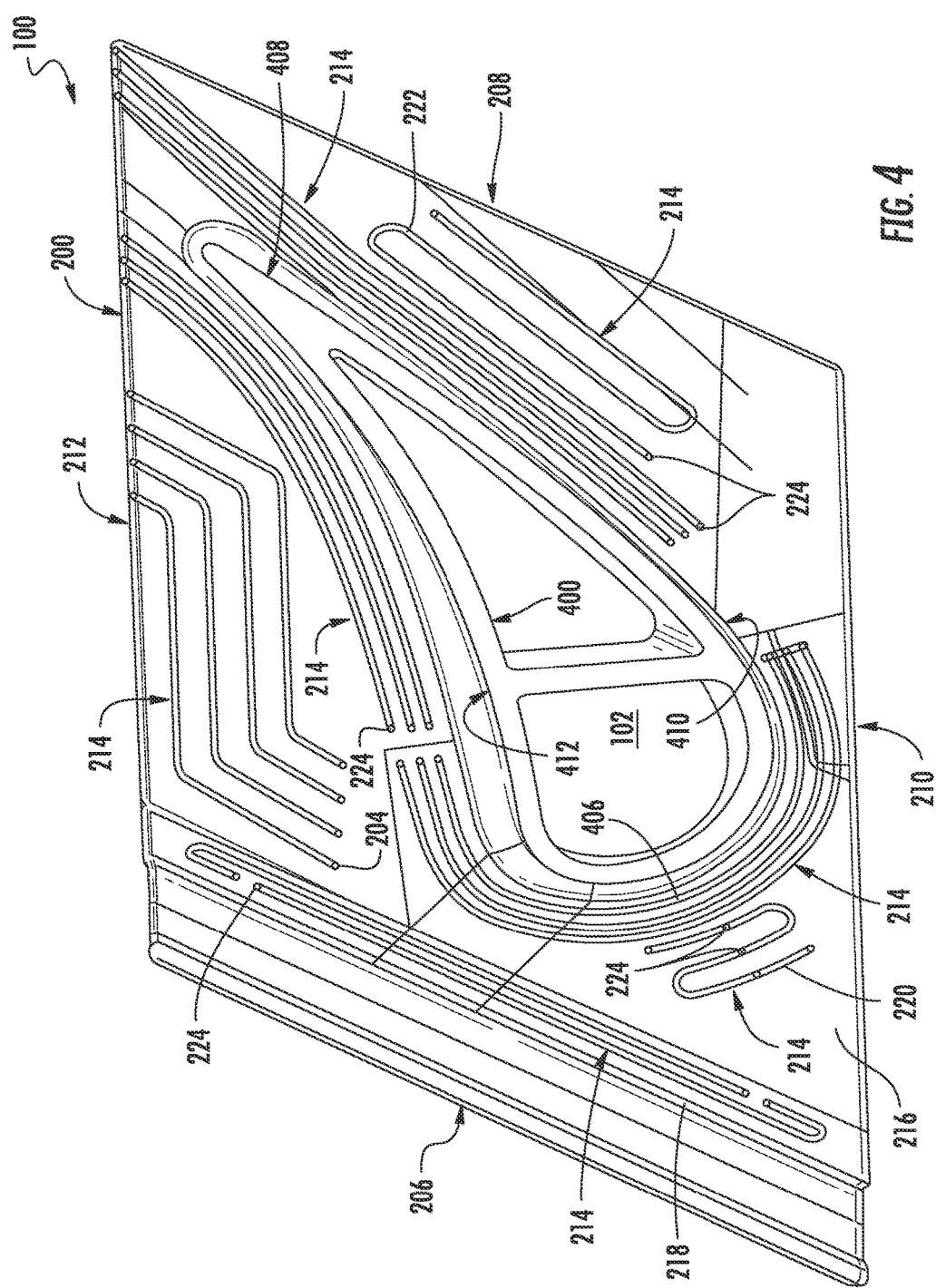
FIG. 4 is a cross sectioned top view of a portion of the turbine nozzle including an inner band as shown in FIG. 3 taken along section line 4-4, according to at least one embodiment of the present invention.
Figure 5:
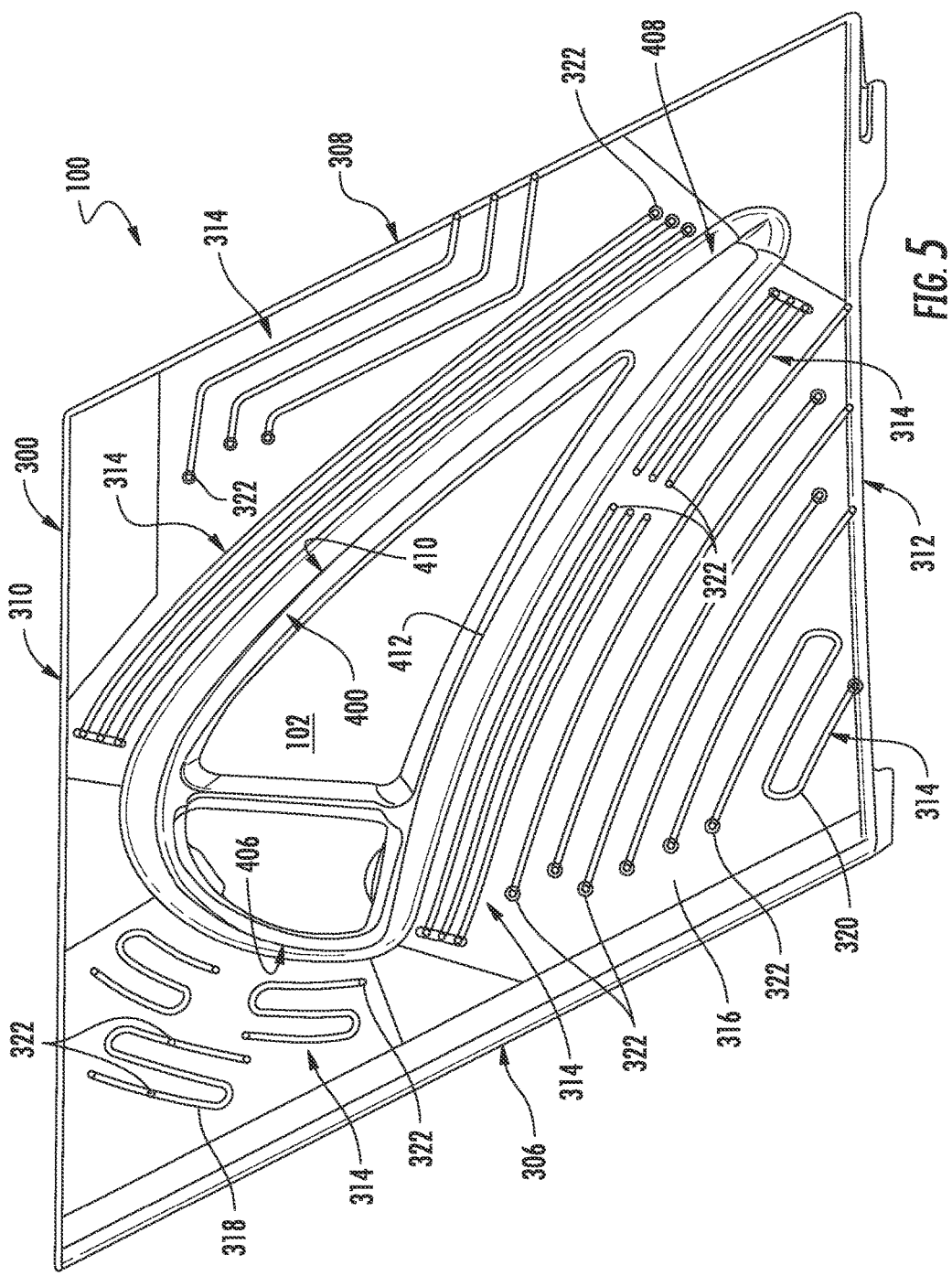
FIG. 5 is a cross sectioned bottom view of a portion of the turbine nozzle including an outer band as shown in FIG. 3 taken along section line 5-5, according to at least one embodiment of the present invention.

FIG. 4 provides a cross sectioned top view of a portion of the turbine nozzle 100 as taken along section line 4-4 as shown in FIG. 3 and includes a portion of the airfoil 400 and the inner band 200 according to one embodiment of the present invention. FIG. 5 provides a cross sectioned bottom view of a portion of the turbine nozzle 100 as taken along section line 5-5 as shown in FIG. 3 and includes a portion of the airfoil 400 and the outer band 300 according to one embodiment of the present invention.

As shown in FIGS. 4 and 5 collectively, the airfoil 400 includes a leading edge portion 406 disposed proximate to forward walls 206, 306 of the inner and outer bands 200, 300 respectfully, a trailing edge portion 408 disposed proximate to aft walls 208, 308 of the inner and outer bands 200, 300 respectfully, a suction side wall 410 and a pressure side wall 412.

As shown in FIG. 4, the inner band 200 includes a suction side wall 210 and a pressure side wall 212. As shown in FIG. 5, the outer band 300 includes a suction side wall 310 and a pressure side wall 312. In various embodiments, as shown in FIGS. 3, 4 and 5 collectively, the turbine nozzle 100 includes and/or at least partially defines a primary cooling channel 102. In one embodiment, the primary cooling channel 102 extends radially through the outer band 300, the airfoil 400 and the inner band 200.

In one embodiment, as shown in FIG. 4, the inner band 200 defines a plurality of cooling channels 214 machined, cast or otherwise formed in a top or gas side surface 216 of the inner band 200, and as shown in FIG. 5, the outer band 300 defines a plurality of cooling channels 314 machined, cast or otherwise formed in a top or gas side surface 316 of the outer band 300.

With regards to the inner band 200, as shown in FIG. 4, the cooling channels 214 may be disposed along the gas side surface 216 in various locations depending on particular cooling requirements of the inner band 200. For example, in particular embodiments, at least some of the plurality of cooling channels 214 may be arranged or oriented so as to follow or substantially follow the curvature or profile of one or more of the leading edge portion 406, the suction side wall 410, the trailing edge portion 408 and the pressure side wall 412 of the airfoil 400. At least some of the cooling channels 214 may be disposed proximate to the suction side wall 210 or the aft wall 208 of the inner band 200. In one embodiment, at least one of the cooling channels 214 extends along a leading edge portion 218 of the inner band 200 between the suction side wall 210 and the pressure side wall 212.

In one embodiment, as shown in FIG. 4, one or more cooling channels of the plurality of cooling channels 214 is serpentine or "S" shaped. In particular embodiments, at least one serpentine shaped cooling channel 220 is disposed between the forward wall 206 of the inner band 200 and the leading edge portion 406 of the airfoil 400. In particular embodiments, at least one serpentine shaped or "S" shaped cooling channel 222 is disposed between the suction side wall 410 of the airfoil and the aft wall 208 of the inner band 200. In particular embodiments, the "S" shaped cooling channel(s) 220 may have variations in depth D along the length or run of the cooling channel to optimize cooling characteristics. For example, the "S" shaped cooling channel(s) 220 may have be deeper in the middle and shallower on at opposite ends of the "S" shaped cooling channel(s) 220.

A plurality of apertures 224 define flow paths for a cooling medium such as the compressed air 38 to flow from the backside 204 (FIG. 3) through the inner band 200 into one or more of the cooling channels 214. One or more of the cooling channels 214 may be configured to exhaust the cooling medium along the suction side wall 210 or the pressure side wall 212 of the inner band 200. The "S" shaped cooling channel(s) 22.0 may have multiple apertures 224 and outlets. For example, one or more of the "S" shaped cooling channel(s) 220 may have an aperture 224 defined proximate to a middle portion of the "S" shaped cooling channel 220 and outlets defined on opposing ends of the "S" shaped cooling channel 220, or may have two apertures 224 at the opposing ends and an outlet proximate to the middle portion of the "S" shaped cooling channel 220.

With regards to the outer band 300, as shown in FIG. 5, the cooling channels 314 may be disposed along the gas side surface 316 in various locations depending on particular cooling requirements of the outer band 300. For example, in particular embodiments, at least some of the plurality of cooling channels 314 may be arranged or oriented so as to follow or substantially follow the curvature or profile of one or more of the leading edge portion 406, the suction side wall 410, the trailing edge portion 408 and the pressure side wall 412 of the airfoil 400. At least some of the cooling channels 314 may be disposed proximate to the suction side wall 310 or the aft wall 308 of the outer band 300.

In one embodiment, as shown in FIG. 5, one or more cooling channels 318 of the plurality of cooling channels 314 is serpentine or "S" shaped. In particular embodiments, the plurality of cooling channels 314 includes at least one serpentine shaped cooling channel 318 disposed between the forward wall 306 of the outer band 300 and the leading edge portion 406 of the airfoil 400. In particular embodiments, the plurality of cooling channels 314 includes at least one serpentine shaped cooling channel 320 disposed between the pressure side wall 412 of the airfoil 400 and the pressure side wall 312 of the outer band 300. In particular embodiments, one or more of the "S" shaped cooling channels 318 may have variations in depth D along the length or run of the cooling channel 318 to optimize cooling characteristics. For example, the "S" shaped cooling channel(s) 318 may have be deeper in the middle and shallower on at opposite ends of the "S" shaped cooling channel(s) 318.

A plurality of apertures 322 define flow paths for a cooling medium such the compressed air 38 to flow from the backside 304 (FIG. 3) through the outer band 300 into one or more of the cooling channels 314. One or more of the cooling channels 314 may be configured to exhaust the cooling medium along the suction side wall 310, the pressure side wall 312 or the aft wall 308 of the outer band 300. One or more of the "S" shaped cooling channel(s) 318 may have multiple apertures 322 and outlets. For example, one or more of the "S" shaped cooling channel(s) 318 may have an aperture 322 defined proximate to a middle portion of the "S" shaped cooling channel 318 and outlets defined on opposing ends of the "S" shaped cooling channel 318, or may have two apertures 322 at the opposing ends and an outlet proximate to the middle portion of the "S" shaped cooling channel 318.

Figure 6:
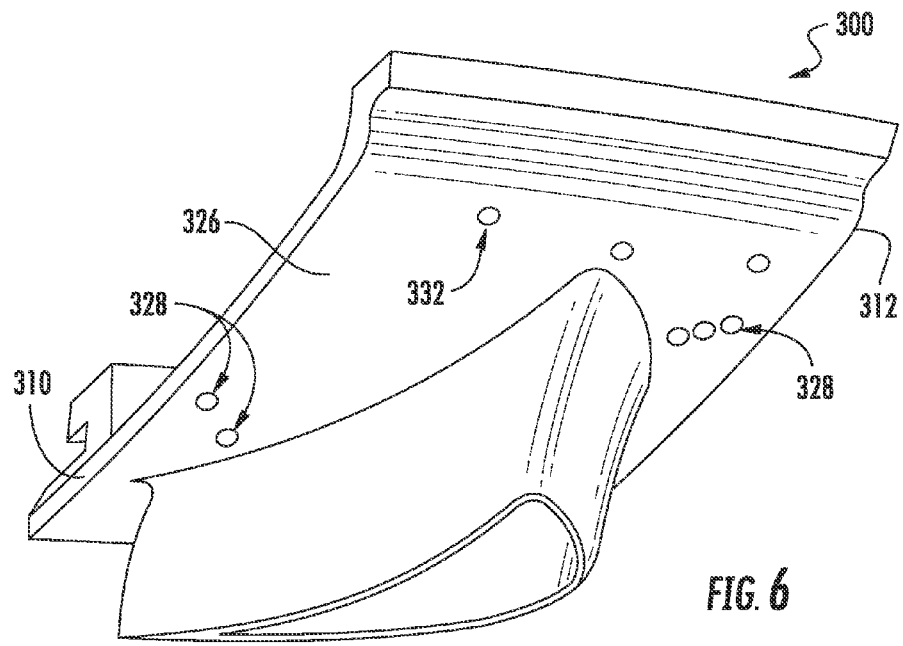
FIG. 6 is a partial perspective view of an outer band portion of the turbine nozzle as shown in FIG. 3, according to at least one embodiment of the present invention.
Figure 7:
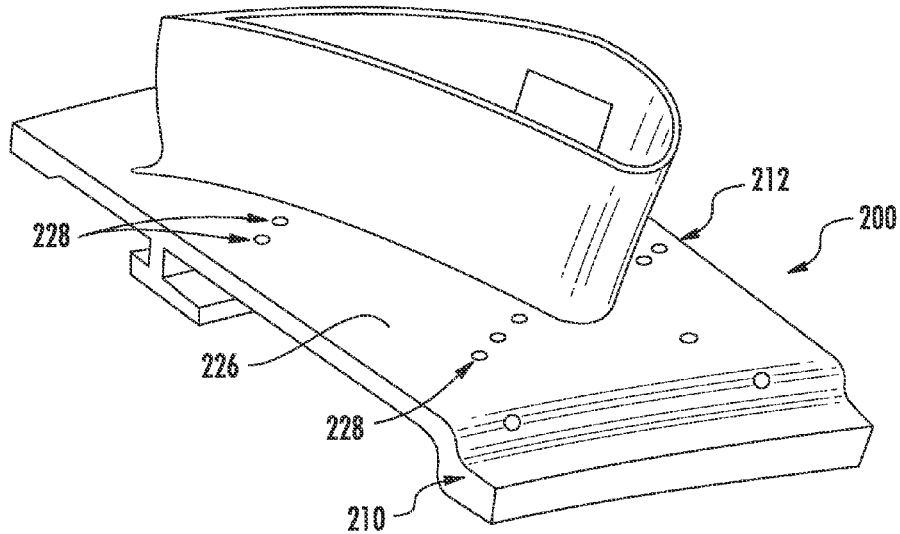
FIG. 7 is a partial perspective view of an inner band portion of the turbine nozzle as shown in FIG. 3, according to at least one embodiment of the present invention.

FIG. 6 provides a cross sectioned radially outward view of the outer band 300 as shown in FIG. 5 according to one embodiment of the present invention. FIG. 6 provides a cross sectioned top view of the inner band 200 as shown in FIG. 4 according to one embodiment of the present invention. In various embodiments, the cooling channels 314 defined along the gas side surface 316 of the outer band 300 (FIG. 5) are covered via one or more outer plates 326. In various embodiments, the cooling channels 214 defined along the gas side surface 216 of the inner band 200 (FIG. 4) are covered via one or more inner plates 226. In particular embodiments, as shown in FIGS. 6 and 7, multiple exhaust ports 228, 328 are defined by one or more of the one or more inner plates 226 and the one or more outer plates 326. Each exhaust port 228, 328 provides a flow path from a corresponding cooling channel 214, 314 through the corresponding inner plate 226 or outer plate 326 respectively so as to provide film cooling to the gas side 202 of the inner band 200 and the gas side 302 of the outer band 300 during fired operation of the gas turbine 10. In particular embodiments, one or more of the exhaust ports 228, 328 may be formed such that a cooling medium flows out of the cooling channels 214, 314 substantially perpendicular with respect to the flow direction of the stream of combustion gas 40. In particular embodiments, one or more of the exhaust ports 228, 328 may be formed such that a cooling medium flows out of the cooling channels 214, 314 at an angle with respect to the flow direction of the stream of combustion gas 40. In particular embodiments, one or more of the exhaust ports 228, 328 may have an at least partially oval, round, triangular, rectangular or square shape. In one embodiment, one or more of the exhaust ports 228, 328 may be formed such that a cooling medium is diffused or spread across a portion of the corresponding gas side 202, 302. In particular embodiments, multiple cooling channels 214, 314 may exhaust through a common exhaust port 228, 328 via a coolant trench.

Figure 8:
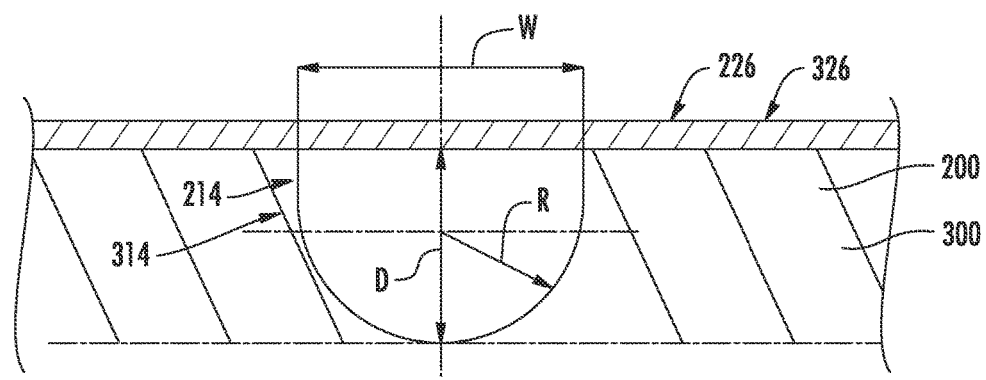
FIG. 8 is a cross sectioned view of an exemplary cooling channel as may be formed in either an inner band or an outer band of the turbine nozzle as shown in FIGS. 4 and 5 respectfully, according to at least one embodiment of the present invention.
Figure 9:
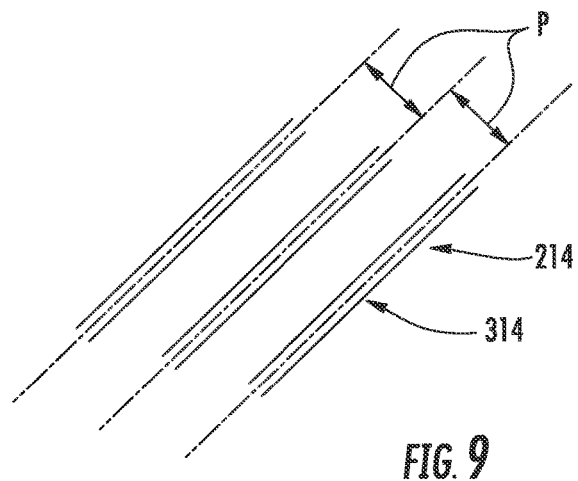
FIG. 9 is a top view of adjacent cooling channels as may be formed in either an inner band or an outer band of the turbine nozzle as shown in FIGS. 4 and 5 respectfully, according to at least one embodiment of the present invention.

FIG. 8 provides a cross sectioned view of an exemplary cooling channel which may be representative of any of cooling channels 214 and 314 according to various embodiments of the present invention. FIG. 9 provides a top view of adjacent cooling channels which may be representative of cooling channels 214 and 314 according to various embodiments of the present invention. Although the exemplary cooling channels 214 and 314 shown in FIG. 8 as having a generally "U" shaped or half round cross sectional profile, it is to be understood that the cooling channels 214 and 314 may have any cross sectional profile and are not limited to the "U" shaped cross sectional profile shown unless otherwise recited in the claims. In particular embodiments, the cooling channels 214 and 314 may have a substantially square cross sectional profile, triangular, teardrop and/or dovetail or other cross sectional profile. The shape and/or size of the cross sectional profile may vary along a length of one or more of the cooling channels 214, 314.

The In particular embodiments, as shown in FIG. 8, each cooling channel 214, 314 has a depth D, a width W and the bottom of each cooling channel 214, 314 has a radius R. The depth D may be measured from the gas side surfaces 216, 316 respectively. As shown in FIG. 9, adjacent cooling channels of the plurality of cooling channels 214, 314 or multiple passes of a single cooling channel such as with serpentine shaped cooling channels are spaced apart at a pitch P. The depth D, width W, radius R and the pitch P between adjacent cooling channels 214, 314 may vary along the gas side surfaces 216, 316 based at least in part on factors such as inner and outer band 200, 300 wall thickness and/or heat distribution across the gas sides 202, 302 of the inner and outer bands 200, 300.

FIG. 10 provides a cross sectioned top view of the inner band 200 as shown in FIG. 4 according to one embodiment of the present invention. FIG. 11 provides a cross sectioned radially outward view of the outer band 300 as shown in FIG. 5 according to one embodiment of the present invention. In particular embodiments, as shown in FIG. 10, the plurality of cooling channels 214 of the inner band 200 may comprise one or more groups of densely packed cooling channels 214(a) and one or more groups of sparsely packed cooling channels 214(b). In particular embodiments, as shown in FIG. 11, the plurality of cooling channels 314 of the outer band 300 may comprise one or more groups of densely packed cooling channels 314(a) and one or more groups of sparsely packed cooling channels 314(b).

In particular embodiments, with regards to the inner band 200, the width W of the cooling channels 214 which make up a group of densely packed cooling channels 214(a) is equal to about two times the radius R. The width W of the cooling channels 214 which make up a group of the sparsely packed cooling channels 214(b) is equal to about two times the radius R. The depth D of the cooling channels 214 which make up the group of the sparsely packed cooling channels 214(b) is equal to about 1.3 times the depth D of the densely packed cooling channels 214(a). The pitch P or spacing between adjacent sparsely packed cooling channels 214(b) is equal to about two times the pitch P between adjacent densely packed cooling channels 214(a).

In one embodiment, the width W of the cooling channels 214 which make up a group of densely packed cooling channels 214(a) is equal to about two times the radius R of those cooling channels. In one embodiment, the width W of the cooling channels 214 which make up a group of the sparsely packed cooling channels 214(b) is equal to two times the radius R of those cooling channels. In one embodiment, the width W of the cooling channels 214 which make up a group of densely packed cooling channels 214(a) is equal to between 1.8 and 2.2 times the radius R of those cooling channels. In particular embodiments, width 214(b) of the cooling channels 214 which make up a group of the sparsely packed cooling channels 214(b) may vary along the run of one or more of the cooling channels 214. For example, side walls of the corresponding cooling channel 214 may be angled or non-vertical.

In particular embodiments, the depth D at a particular location of one or more cooling channels 214 of the sparsely packed cooling channels 214(b) is equal to between about 1.3 and about 2.5 times the depth D at a particular location of one or more cooling channels 214 of the densely packed cooling channels 214(a). In one embodiment, the depth D at a particular location of one or more cooling channels 214 of the sparsely packed cooling channels 214(b) is equal to between 1.3 and 2.5 times the depth D of the densely packed cooling channels 214(a). In one embodiment, the depth D at a particular location of one or more cooling channels 214 of the sparsely packed cooling channels 214(b) is equal to between 2.0 and 5.0 times the depth D of the densely packed cooling channels 214(a). In one embodiment, the depth D at a particular location of one or more cooling channels 214 of the sparsely packed cooling channels 214(b) is equal to 1.3 times the depth D of the densely packed cooling channels 214(a). In particular embodiments, the depth D may vary along a run of one or more cooling channels 214 of the sparsely packed cooling channels 214(b).

The pitch P or spacing between adjacent sparsely packed cooling channels 214(b) is equal to between about two to five times the pitch P between adjacent densely packed cooling channels 214(a). In particular embodiments, the pitch P or spacing between adjacent sparsely packed cooling channels 214(b) is equal to two times the pitch P between adjacent densely packed cooling channels 214(a).

In particular embodiments, with regards to the outer band 300, the width W of the cooling channels 314 which make up a group of densely packed cooling channels 314(a) is equal to about two times the radius R. The width W of the cooling channels 314 which make up a group of the sparsely packed cooling channels 314(b) is equal to about two times the radius R. The depth D of the cooling channels 314 which make up the group of the sparsely packed cooling channels 314(b) is equal to about 1.3 times the depth D of the densely packed cooling channels 314(a). The pitch P or spacing between adjacent sparsely packed cooling channels 314(b) is equal to about two times the pitch P between adjacent densely packed cooling channels 314(a).

In one embodiment, the width W of the cooling channels 314 which make up a group of densely packed cooling channels 314(a) is equal to about two times the radius R of those cooling channels. In one embodiment, the width W of the cooling channels 314 which make up a group of the sparsely packed cooling channels 314(b) is equal to two times the radius R of those cooling channels. In one embodiment, the width W of the cooling channels 314 which make up a group of densely packed cooling channels 314(a) is equal to between 1.8 and 2.2 times the radius R of those cooling channels. In particular embodiments, width 314(b) of the cooling channels 314 which make up a group of the sparsely packed cooling channels 314(b) may vary along the run of one or more of the cooling channels 314. For example, side walls of the corresponding cooling channel 314 may be angled or non-vertical.

In particular embodiments, the depth D at a particular location of one or more cooling channels 314 of the sparsely packed cooling channels 314(b) is equal to between about 1.3 and about 2.5 times the depth D at a particular location of one or more cooling channels 314 of the densely packed cooling channels 314(a). In one embodiment, the depth D at a particular location of one or more cooling channels 314 of the sparsely packed cooling channels 314(b) is equal to between 1.3 and 2.5 times the depth D of the densely packed cooling channels 314(a). In one embodiment, the depth D at a particular location of one or more cooling channels 314 of the sparsely packed cooling channels 314(b) is equal to between 2.0 and 5.0 times the depth D of the densely packed cooling channels 314(a). In one embodiment, the depth D at a particular location of one or more cooling channels 314 of the sparsely packed cooling channels 314(b) is equal to 1.3 times the depth D of the densely packed cooling channels 314(a). In particular embodiments, the depth D may vary along a run of one or more cooling channels 314 of the sparsely packed cooling channels 314(b).

The pitch P or spacing between adjacent sparsely packed cooling channels 314(b) is equal to between about two to five times the pitch P between adjacent densely packed cooling channels 314(a). In particular embodiments, the pitch P or spacing between adjacent sparsely packed cooling channels 314(b) is equal to two times the pitch P between adjacent densely packed cooling channels 314(a).

The cooling channels 214, 314 provided herein result in various technical advantages over exiting cooling schemes for turbine nozzles. For example, the cooling channels provided herein run along the gas side surfaces 216, 316 just underneath the inner plates 226 or outer plates 326 respectfully. This prevents the bulk of the inner band 200 and the outer band 200 from being exposed to the high temperatures of the stream of combustion gases 40, thus preventing softening of the base metal and improving material life of the inner and outer bands 200, 300 over time. The cooling channels 214, 314 as presented herein may reduce the amount of cooling medium required and keep the operating temperature of the inner and outer bands 200, 300 within acceptable limits.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other and examples are intended to be within the scope of the claims if they include structural elements that do not differ from the literal language of the claims, or if they include equivalent structural elements with insubstantial differences from the literal language of the claims.

What is claimed is:

1. A turbine nozzle, comprising:
    an airfoil that extends in span from an inner band to an outer band, the inner band and the outer band define inner and outer flow boundaries of the turbine nozzle;
    one or more inner plates at least partially covering a gas side surface of the inner band;
    a plurality of cooling channels formed within the gas side surface of the inner band beneath the one or more inner plates;
    one or more outer plates at least partially covering a gas side surface of the outer band;
    a plurality of cooling channels formed within the gas side surface of the outer band beneath the one or more outer plates, the plurality of cooling channels of the outer band comprising at least one serpentine shaped cooling channel defined between a pressure side wall of the airfoil and a pressure side wall of the outer band and at least one cooling channel oriented to follow a curvature of the pressure side wall of the airfoil;
    a first aperture defining a flow path for a cooling medium to flow into the at least one serpentine shaped cooling channel;
    a second aperture defining a flow path for the cooling medium to flow into the at least one cooling channel oriented to follow the curvature of the pressure side wall of the airfoil;
    a plurality of exhaust ports defined in the one or more inner plates, each of the plurality of exhaust ports extending radially outward through a corresponding inner plate of the one or more inner plates from a corresponding one of the plurality of cooling channels of the inner band; and
    a plurality of exhaust ports defined in the one or more outer plates, each of the plurality of exhaust ports extending radially inward through a corresponding outer plate of the one or more outer plates from a corresponding one of the plurality of cooling channels of the outer band.

2. The turbine nozzle as in claim 1, wherein the plurality of cooling channels of the outer band comprises at least one serpentine shaped cooling channel defined between a leading edge portion of the airfoil and a forward wall of the outer band.

3. The turbine nozzle as in claim 1, wherein the plurality of cooling channels of the inner band comprises at least one serpentine shaped cooling channel.

4. The turbine nozzle as in claim 1, wherein the plurality of cooling channels of the inner band comprises at least one serpentine shaped cooling channel defined between a leading edge portion of the airfoil and a forward wall of the inner band.

5. The turbine nozzle as in claim 1, wherein the plurality of cooling channels of the inner band comprises at least one serpentine shaped cooling channel defined between a pressure side wall of the airfoil and a pressure side wall of the outer band.

6. The turbine nozzle as in claim 1, wherein the plurality of cooling channels of the inner band comprises at least one cooling channel disposed along a leading edge portion of the inner band and extending between a pressure side wall and a suction side wall of the inner band.

7. The turbine nozzle as in claim 1, wherein the plurality of cooling channels of the outer band comprises a group of densely spaced cooling channels and a group of sparsely spaced cooling channels.

8. The turbine nozzle as in claim 1, wherein the plurality of cooling channels of the inner band comprises a group of densely spaced cooling channels and a group of sparsely spaced cooling channels.

9. A gas turbine, comprising:
a compressor;
a combustor downstream from the compressor; and
a turbine disposed downstream from the combustor, wherein the turbine comprises a stage having a row of turbine nozzles and a row of turbine rotor blades, at least one turbine nozzle comprising:
an airfoil that extends in span from an inner band to an outer band, wherein the inner band and the outer band define inner and outer flow boundaries of the turbine nozzle;
one or more inner plates at least partially covering a gas side surface of the inner band;
a plurality of cooling channels formed within the gas side surface of the inner band beneath the one or more inner plates, the plurality of cooling channels of the inner band comprising at least one serpentine shaped cooling channel defined between a leading edge portion of the airfoil and a forward wall of the inner band and at least one cooling channel disposed along a leading edge portion of the airfoil and extending between a pressure side wall and a suction side wall of the airfoil;
a first aperture defining a flow path for a cooling medium to flow into the at least one serpentine shaped cooling channel;
a second aperture defining a flow path for the cooling medium to flow into the at least one cooling channel disposed along the leading edge portion of the airfoil;
one or more outer plates at least partially covering a gas side surface of the outer band;
a plurality of cooling channels formed within the gas side surface of the outer band beneath the one or more outer plates;
a plurality of exhaust ports defined in the one or more inner plates, each of the plurality of exhaust ports extending radially outward through a corresponding inner plate of the one or more inner plates from a corresponding one of the plurality of cooling channels of the inner band; and
a plurality of exhaust ports defined in the one or more outer plates, each of the plurality of exhaust ports extending radially inward through a corresponding outer plate of the one or more outer plates from a corresponding one of the plurality of cooling channels of the outer band.

10. The gas turbine as in claim 9, wherein the plurality of cooling channels of the outer band comprises at least one serpentine shaped cooling channel.

11. The gas turbine as in claim 9, wherein the plurality of cooling channels of the outer band comprises at least one serpentine shaped cooling channel defined between a leading edge portion of the airfoil and a forward wall of the outer band.

12. The gas turbine as in claim 9, wherein the plurality of cooling channels of the outer band comprises at least one serpentine shaped cooling channel defined between a pressure side wall of the airfoil and a pressure side wall of the outer band.

13. The gas turbine as in claim 9, wherein the plurality of cooling channels of the inner band comprises at least one serpentine shaped cooling channel defined between a pressure side wall of the airfoil and a pressure side wall of the outer band.

14. The gas turbine as in claim 9, wherein the plurality of cooling channels of the outer band comprises a group of densely spaced cooling channels and a group of sparsely spaced cooling channels.

15. The gas turbine as in claim 9, wherein the plurality of cooling channels of the inner band comprises a group of densely spaced cooling channels and a group of sparsely spaced cooling channels.

16. A turbine nozzle, comprising:
an airfoil that extends in span from an inner band to an outer band, the inner band and the outer band define inner and outer flow boundaries of the turbine nozzle;
one or more inner plates at least partially covering a gas side surface of the inner band;
a plurality of cooling channels formed within the gas side surface of the inner band beneath the one or more inner plates, the plurality of cooling channels of the inner band comprising at least one serpentine shaped cooling channel defined between a leading edge portion of the airfoil and a forward wall of the inner band and at least one cooling channel disposed along a leading edge portion of the airfoil and extending between a pressure side wall and a suction side wall of the airfoil;
a first aperture defining a flow path for a cooling medium to flow into the at least one serpentine shaped cooling channel;
a second aperture defining a flow path for the cooling medium to flow into the at least one cooling channel disposed along the leading edge portion of the airfoil;
one or more outer plates at least partially covering a gas side surface of the outer band;
a plurality of cooling channels formed within the gas side surface of the outer band beneath the one or more outer plates;
a plurality of exhaust ports defined in the one or more inner plates, each of the plurality of exhaust ports extending radially outward through a corresponding inner plate of the one or more inner plates from a corresponding one of the plurality of cooling channels of the inner band; and
a plurality of exhaust ports defined in the one or more outer plates, each of the plurality of exhaust ports extending radially inward through a corresponding outer plate of the one or more outer plates from a corresponding one of the plurality of cooling channels of the outer band.

17. The turbine nozzle as in claim 16, wherein the plurality of cooling channels of the outer band comprises at least one serpentine shaped cooling channel defined between a pressure side wall of the airfoil and a pressure side wall of the outer band and at least one cooling channel oriented to follow a curvature of the pressure side wall of the airfoil.

18. The turbine nozzle as in claim 16, wherein the plurality of cooling channels of the outer band comprises a group of densely spaced cooling channels and a group of sparsely spaced cooling channels.

19. The turbine nozzle as in claim 16, wherein the plurality of cooling channels of the inner band comprises a group of densely spaced cooling channels and a group of sparsely spaced cooling channels.

* * * * *